US009330305B2

(12) United States Patent
Zhao et al.

(10) Patent No.: US 9,330,305 B2
(45) Date of Patent: May 3, 2016

(54) METHOD AND DEVICE FOR DETECTING A SEATING POSITION IN A VEHICLE

(71) Applicant: Motorola Mobility LLC, Chicago, IL (US)

(72) Inventors: Hong Zhao, Naperville, IL (US); Mark F Valentine, Kenosha, WI (US)

(73) Assignee: Google Technology Holdings LLC, Mountain View, CA (US)

( * ) Notice: Subject to any disclaimer, the term of this patent is extended or adjusted under 35 U.S.C. 154(b) by 141 days.

(21) Appl. No.: 14/219,149

(22) Filed: Mar. 19, 2014

(65) Prior Publication Data
US 2015/0186715 A1    Jul. 2, 2015

Related U.S. Application Data

(60) Provisional application No. 61/921,496, filed on Dec. 29, 2013.

(51) Int. Cl.
*G06K 9/00* (2006.01)
*H04N 7/18* (2006.01)

(52) U.S. Cl.
CPC ........ *G06K 9/00369* (2013.01); *G06K 9/00838* (2013.01); *H04N 7/183* (2013.01)

(58) Field of Classification Search
None
See application file for complete search history.

(56) References Cited

U.S. PATENT DOCUMENTS

| 5,877,707 | A | * | 3/1999 | Kowalick | B60R 1/12 340/439 |
| 6,801,662 | B1 | * | 10/2004 | Owechko | G06K 9/00201 382/103 |
| 8,290,480 | B2 | | 10/2012 | Abramson et al. | |
| 2005/0263992 | A1 | * | 12/2005 | Matsuda | G01S 5/163 280/735 |
| 2007/0025597 | A1 | * | 2/2007 | Breed | B60N 2/002 382/104 |
| 2008/0116680 | A1 | * | 5/2008 | Mita | B60R 21/01538 280/801.1 |
| 2010/0201507 | A1 | * | 8/2010 | Rao | B60R 21/01538 340/435 |

FOREIGN PATENT DOCUMENTS

EP    1069002 A1    1/2001

OTHER PUBLICATIONS

Bankrate, "High-Tech Speed Camera Checks Insurance, Seat Belt", http://www.bankrate.com/financing/cars/high-tech-speed-camera-checks-insurance-seat-belt/, Sep. 27, 2013, 4 pages.

* cited by examiner

*Primary Examiner* — Andrae S Allison
(74) *Attorney, Agent, or Firm* — Shumaker & Sieffert, P.A.

(57) ABSTRACT

In one embodiment a method performed by an electronic device for determining a seating position of a person in a vehicle, the method comprises capturing at least one image of an environment of a vehicle, detecting, from the at least one captured image, an orientation of a retraining device within the vehicle, and determining the seating position of a person within the restraining device based on the orientation of the restraining device.

20 Claims, 9 Drawing Sheets

METHOD AND DEVICE FOR DETECTING A SEATING POSITION IN A VEHICLE

RELATED APPLICATIONS

This application is a non-provisional application of commonly assigned U.S. Provisional Patent Application No. 61/921,496, filed on Dec. 29, 2013, from which benefits under 35 USC §119(e) are hereby claimed and the contents of which are hereby incorporated by reference herein.

FIELD OF THE DISCLOSURE

The present disclosure relates to electronic devices such as mobile devices and, more particularly, to a method and device for determining the seating position of an occupant of a vehicle based on the orientation of a restraining device.

BACKGROUND

Mobile devices, such as smartphones and tablet computers, are becoming better suited for use in different locations. People, however, are using their mobile electronic devices in locations where use of the device could be dangerous, or even illegal. For example, some people are using their electronic devices while operating a motor vehicle.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
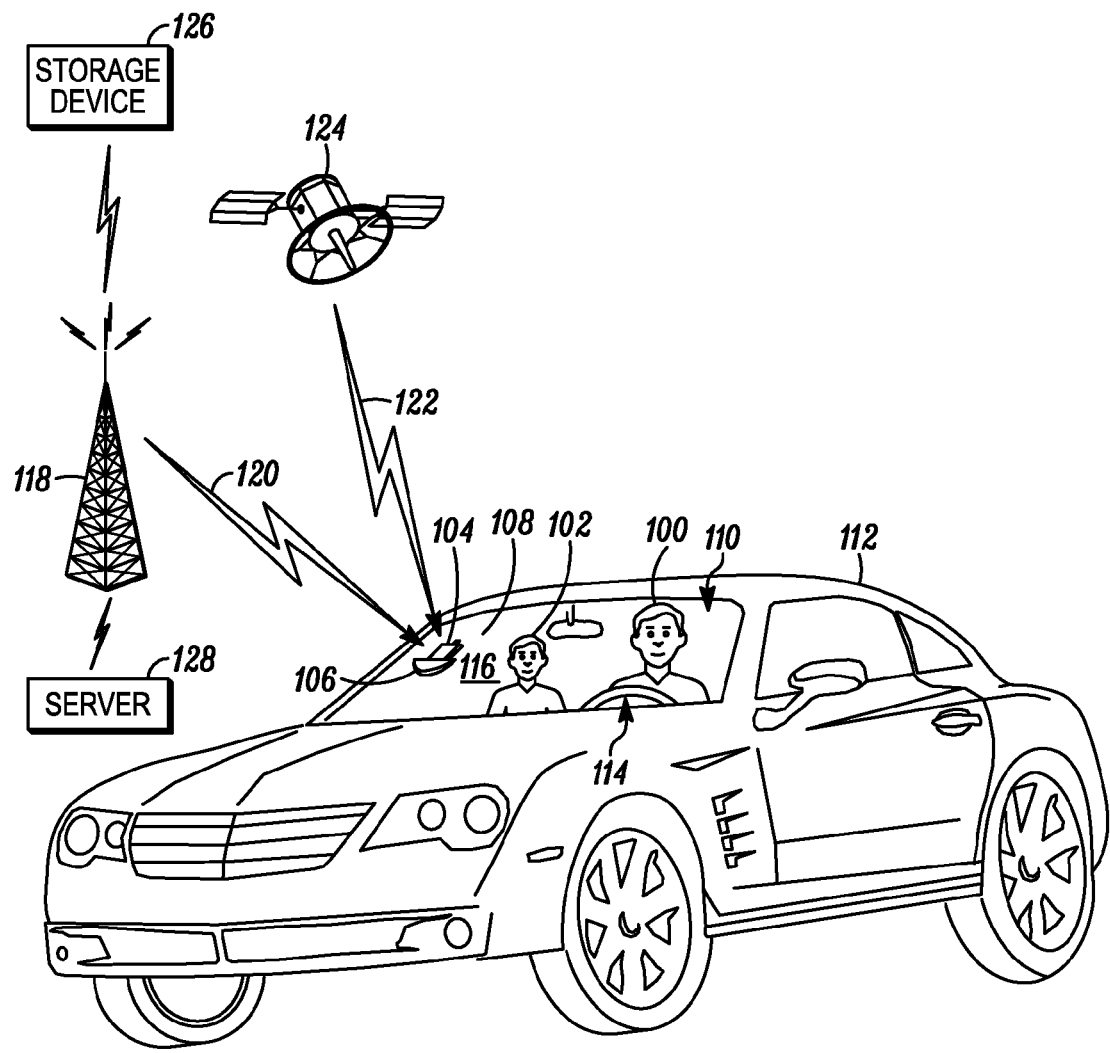
FIG. 1 is a schematic diagram of an example environment within which may be implemented methods and devices for determining a seating position of a person in a vehicle based on a restraining device orientation in accordance with embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of disclosed embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and device for determining the seating position of a person within a vehicle based on the orientation of a restraining device within which the person is sitting. In one embodiment, an electronic device that the person is operating is used to capture at least one image during operation of the electronic device. Image processing is performed on the at least one image to detect a restraining device in the image and to determine, based on an orientation of the restraining device, if the person within the restraining device is sitting in the driver's seat of a vehicle.

Accordingly, provided in one embodiment is a method performed by an electronic device for determining a seating position of a person in a vehicle. The method includes capturing at least one image of an environment of a vehicle, and detecting an orientation of a retraining device within the vehicle from the at least one captured image. The method also includes determining the seating position of a person within the restraining device based on the orientation of the restraining device.

Also, provided in another embodiment is an electronic device configured to determine a seating position of a person within a vehicle. The electronic device includes imaging apparatus configured to capture a set of images, which includes at least one image of a person within a restraining device of a vehicle. The electronic device also includes a processor coupled to the imaging apparatus and configured to determine a seating position of the person based on an orientation of the restraining device.

Turning now to FIG. 1, illustrated therein is a schematic diagram of an example environment within which may be implemented methods and devices for determining an orientation of a vehicular restraining device in accordance with the present teachings. In this particular embodiment, an electronic device 104, which, in this example is a mobile, communication or portable device, is docked within a car docking station 106 on a windshield 116 of a motor vehicle 112, also referred to herein simply as a "vehicle". Other car docking station locations within the vehicle 112 are possible, such as on a dashboard of the vehicle 112. Further, in other example scenarios the vehicle 112 may have one or more occupants each holding an electronic device, for instance similar to the device 104. Moreover, the motor vehicle 112 in this case is an automobile, but can be any type of motor vehicle including, but not limited to, a Sports Utility Vehicle (SUV), a truck, a minivan, a taxicab, a train, a bus, a mail delivery truck, etc.

In this illustrative embodiment, the device 104 is further configured for establishing wireless connections 120 to external devices such as a storage device 126, a server, 128 or other mobile or portable devices. In an embodiment, the wireless connections 120 are established using infrastructure equipment such as a cellular tower or base station 118. Wireless connections 120 may be used to determine a geographic location of the device 104. The device 104 is also configured for establishing wireless connections 122 with other infrastructure equipment such as a satellite 124, wherein the wireless connections 122 can also be used to determine the geographic location of the device 104. As used herein, a geographic location identifies a place or area on the Earth's surface. In an embodiment, the geographic location is identified and/or expressed as a general place or area such as a country, town, city, jurisdiction, region, municipality, locality, territory, etc. In another embodiment, the geographic location is identified or expressed as an absolute location or designation using, for example: a specific pairing of latitude and longitude, a Cartesian coordinate grid (e.g., a Spherical coordinate system), an ellipsoid-based system (e.g., World Geodetic System), or similar methods.

Also illustrated in FIG. 1 is a driver 100 seated on a driver side 110 of the vehicle 112 in front of a steering wheel 114. A passenger 102 is seated on a passenger side 108 of the vehicle 112. In other example scenarios, the vehicle 112 also includes other passengers sitting in a backseat on the driver's side 110 behind the driver 100, and/or on the passenger's side 108 behind the passenger 102. In general, the driver and passenger sides of a vehicle are correlated or associated with a particular geographic region or jurisdiction, such as a country in which the vehicle is expected to be driven. Universally, regulations require all bidirectional traffic in a geographic area to keep either to the right (right-hand traffic) or left (left-hand traffic) side of the road, respectively In general, each country specifies either left-hand traffic or right-hand traffic. Accordingly, whether a country requires right-hand traffic or left-hand traffic is a "normal" traffic flow rule of the road for the country. However, for a few countries there are some exceptions to the normal traffic rule of the road. For example, the United States is a right-hand traffic country, wherein right-hand traffic is the normal traffic flow rule of the road for this country. However, an exception is traffic in the United States Virgin Islands, which, like on many Caribbean islands, drives on the left side of the road.

Accordingly, vehicles are manufactured in both left-hand drive and right-hand drive configurations, referring to the placement of the driving seat, steering wheel and controls within the vehicle. Typically, the placement of the steering wheel is opposite to the rule of the road: left-hand traffic countries use right-hand drive vehicles; and right-hand traffic countries use left-hand drive vehicles. As shown, the vehicle 112 has a left-hand drive configuration with a driver's seat and corresponding driver's side 110 on the left side of the vehicle 112, and would normally be operated in a right-hand traffic country such as the United States.

Figure 2:
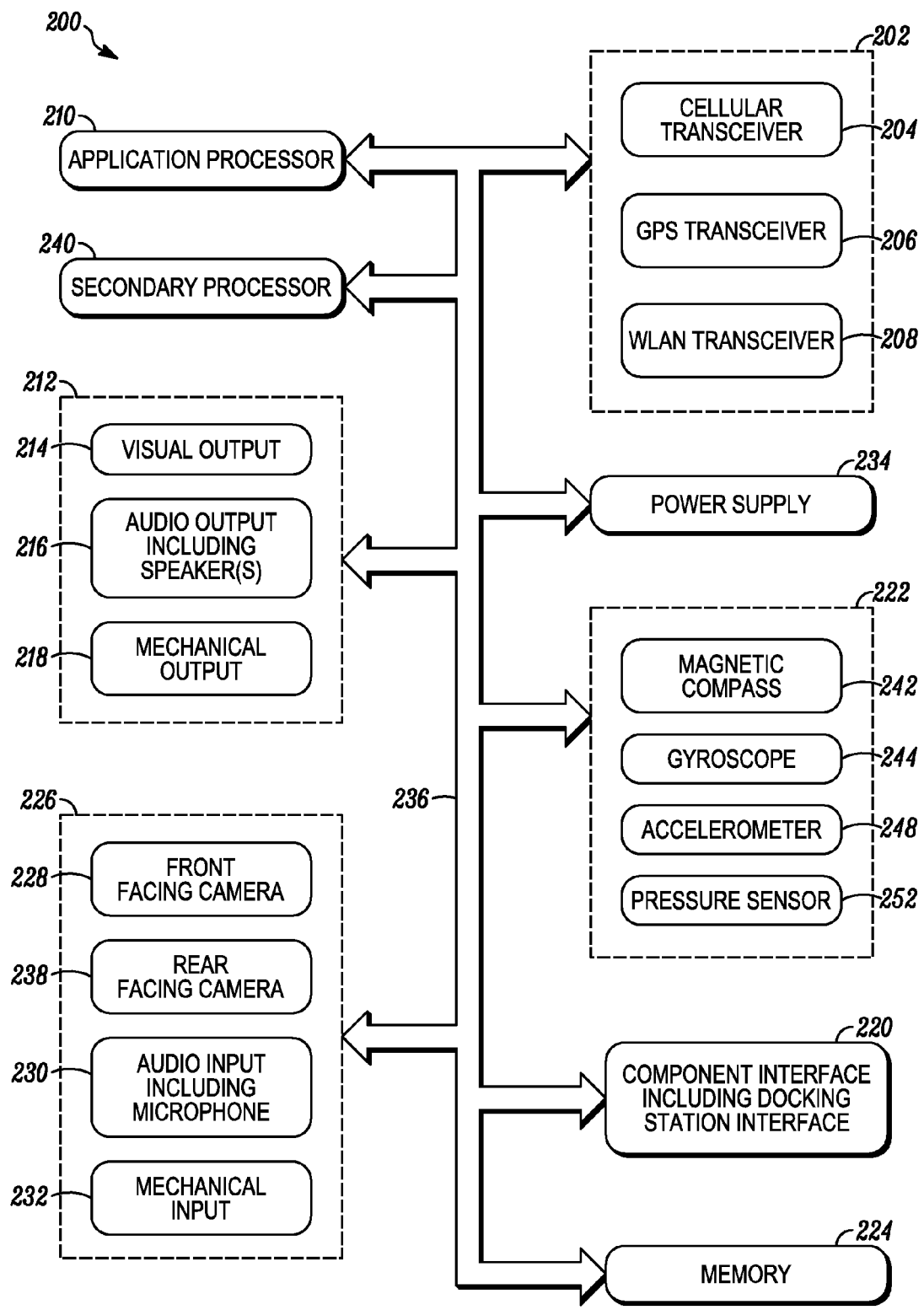
FIG. 2 is a block diagram showing example components of a mobile device illustrated in FIG. 1.

Referring now to FIG. 2, there is provided a block diagram illustrating example internal components 200 of an electronic device, such as the mobile device 104 of FIG. 1, in accordance with the present embodiment. The mobile device 104 is intended to be representative of a variety of mobile devices including, for example, cellular telephones, personal digital assistants (PDAs), smart phones, or other handheld or portable electronic devices. In alternate embodiments, the mobile device 104 is an audio- or video-file player such as a MP3 player or a personal media player (PMP); a navigation device; a wearable device such as one worn on a wrist; or another mobile device capable of or configured to receive tactile or touch input from a user or other input that a user provides using his hands, which could interfere with an activity such as driving. Moreover, embodiments of the present disclosure are intended to be applicable to any of a variety of electronic devices that are capable of or configured to capture images of an environment in which the device resides.

As shown in FIG. 2, the internal elements or components 200 include one or more wireless transceivers 202, one or more processors including an application processor 210 and a secondary processor 240, output components 212, a component interface 220, sensors 222, a memory component 224, input components 226, and a power supply 234. As further illustrated, the internal components 200 are coupled to one another, and in communication with one another, by way of one or more internal communication links 236, for instance an internal bus. A limited number of device components 202, 210, 212, 220, 222, 224, 226, 234 and 240 are shown at 200 for ease of illustration, but other embodiments may include a lesser or greater number of such components in a device, such as device 104. Moreover, other elements needed for a commercial embodiment of a device that incorporates the components shown at 200 are omitted from FIG. 2 for clarity in describing the enclosed embodiments.

We now turn to a brief description of the components within the schematic diagram 200. In general, the processors 210 and 240 are configured with functionality in accordance with embodiments of the present disclosure as described in detail below with respect to the remaining FIGS. 3-9. "Adapted," "operative," "capable" or "configured," as used herein, means that the indicated elements or components are implemented using one or more hardware components, which may or may not be programmed with software and/or firmware as the means for the indicated elements to implement their desired functionality. The functionality of the processors 210 and 240 is supported by the other hardware shown in FIG. 2, including the device components 202, 212, 220, 222, 224, 226, and 234.

Continuing with the brief description of the device components shown at 200, as included within the device 104, the wireless transceivers 202 particularly include a cellular transceiver 204, a Global Positioning System (GPS) transceiver 206, and a wireless local area network (WLAN) transceiver 208. More particularly, the cellular transceiver 204 is configured to conduct cellular communications of data over the wireless connections 120 using any suitable wireless technology, such as Third Generation (3G), Fourth Generation (4G), 4G Long Term Evolution (LTE), etc., vis-à-vis cell towers or base stations, such as the base station 118. In other embodiments, the cellular transceiver 204 is configured to utilize any of a variety of other cellular-based communication technologies such as: analog communications (using Advanced Mobile Phone System—AMPS); digital communications (using Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.); and/or next generation communications (using Universal Mobile Telecommunication System (UMTS), Wideband CDMA (WCDMA), LTE, Institute of Electrical and Electronics Engineers (IEEE) 802.16, etc.), or variants thereof.

Moreover, the transceivers 202 enable the determination of the geographic location of the mobile device 104. This is accomplished, for example, using the GPS transceiver 206 and/or the cellular transceiver 204. In one particular embodiment, the cellular transceiver 204 is configured to receive the geographic location of the device 104 from a second device, such as the base station 118. Similarly, in another embodiment, the WLAN transceiver 208 is configured to receive the geographic location of the device 104 from a second device, such as a Wi-Fi router installed in a fixed location. In yet another embodiment, the transceivers 202 function as a device location module configured to determine the geographic location of the device. In one particular embodiment, the device location module includes the GPS transceiver 206. In another embodiment, the device location module includes a multi-angulation circuit. For example, the cellular transceiver 206 is part of the multi-angulation circuit, which may use multi-angulation techniques such as triangulation to determine a position of the device 104.

In an embodiment, the processors 210, 240 include arithmetic logic and registers necessary to perform the digital processing required by the device 104 to perform image analysis to determine an orientation of a restraining device in a manner consistent with the embodiments described herein. For one embodiment, the processor 210 represents a primary microprocessor of the device 104 such as an application processor of a smartphone 104. Also in one embodiment, the processor 240 is an ancillary processor, separate from the application processor 210, which is dedicated to providing the processing capability, in whole or in part, needed for the device elements 200 to perform their intended functionality.

In the embodiment shown, the output components 212 include: one or more visual output components 214 such as a liquid crystal display and/or light emitting diode indicator; one or more audio output components 216 such as a speaker, alarm, and/or buzzer; and one or more mechanical output components 218 such as a vibrating mechanism. Similarly, the input components 226 include imaging apparatus that in this case includes a front facing camera 228 and a rear facing camera 238; one or more acoustic or audio input components 230 such as one or more transducers (e.g., microphones), including for example a microphone array and beamformer arrangement or a microphone of a Bluetooth headset; and one or more mechanical input components 232 such as a touchscreen display, flip sensor, keyboard, keypad selection button, and/or switch. In an embodiment, the front facing camera 228 is disposed on a face or front of the electronic device, that is, the side of the electronic device 104 that includes other input components, such as a touch screen, with which the user typically interacts. The rear facing camera 238 is disposed on a back side of the device 104, that is, the side opposite to the front of the device 104.

As mentioned above, this embodiment of internal components 200 also includes one or more of various types of sensors 222 as well as a sensor hub to manage one or more functions of the sensors 222. The sensors 222 include for purposes of the present teachings, but are not limited to, a magnetic compass 242, a gyroscope 244, an accelerometer 248, and a pressure sensor 252, such as a barometer. Other types of sensors can be included in other embodiments. The sensors 222 allow the device 104 to determine its velocity, acceleration, and/or higher-order derivatives of position with respect to time, for example.

The memory component 224 encompasses, in some embodiments, one or more memory elements of any of a variety of forms, for example read-only memory, random access memory, static random access memory, dynamic random access memory, etc. In an embodiment, one or both of the processors 210, 240 uses the memory component 224 to store and retrieve data. In some embodiments, the memory component 224 is integrated with one or both of the processors 210, 240 into a single component such as on an integrated circuit. However, such a single component still usually has distinct portions or sections that perform the different processing and memory functions.

The data that is stored by the memory component 224 includes, but need not be limited to, operating systems, programs (applications), and informational data. Each operating system includes executable code that controls basic functions of the electronic device 104, such as interaction among the various components included among the internal components 200, communication with external devices via the wireless transceivers 202 and/or the component interface 220, and storage and retrieval of programs and data, to and from the memory component 224. As for programs, each program includes executable code that utilizes an operating system to provide more specific functionality, such as file system service and handling of protected and unprotected data stored in the memory component 224. Such programs include, among other things, programming for enabling the mobile device 104 to perform methods or processes such as those described below by reference to FIGS. 4-9. Finally, with respect to informational data, this is non-executable code or information that an operating system or program references and/or manipulates, in one embodiment, for performing functions of the mobile device 104.

In an embodiment, the component interface 220 provides a direct connection to auxiliary components or accessories for additional or enhanced functionality. The component interface 220 at the least includes a docking interface that is configured to detect coupling of the mobile device 104 to a docking station, such as the car docking station 106 within the vehicle 112. The power supply 234, such as a battery, provides power to the other internal components 200 while enabling the mobile device 104 to be portable.

Figure 3:
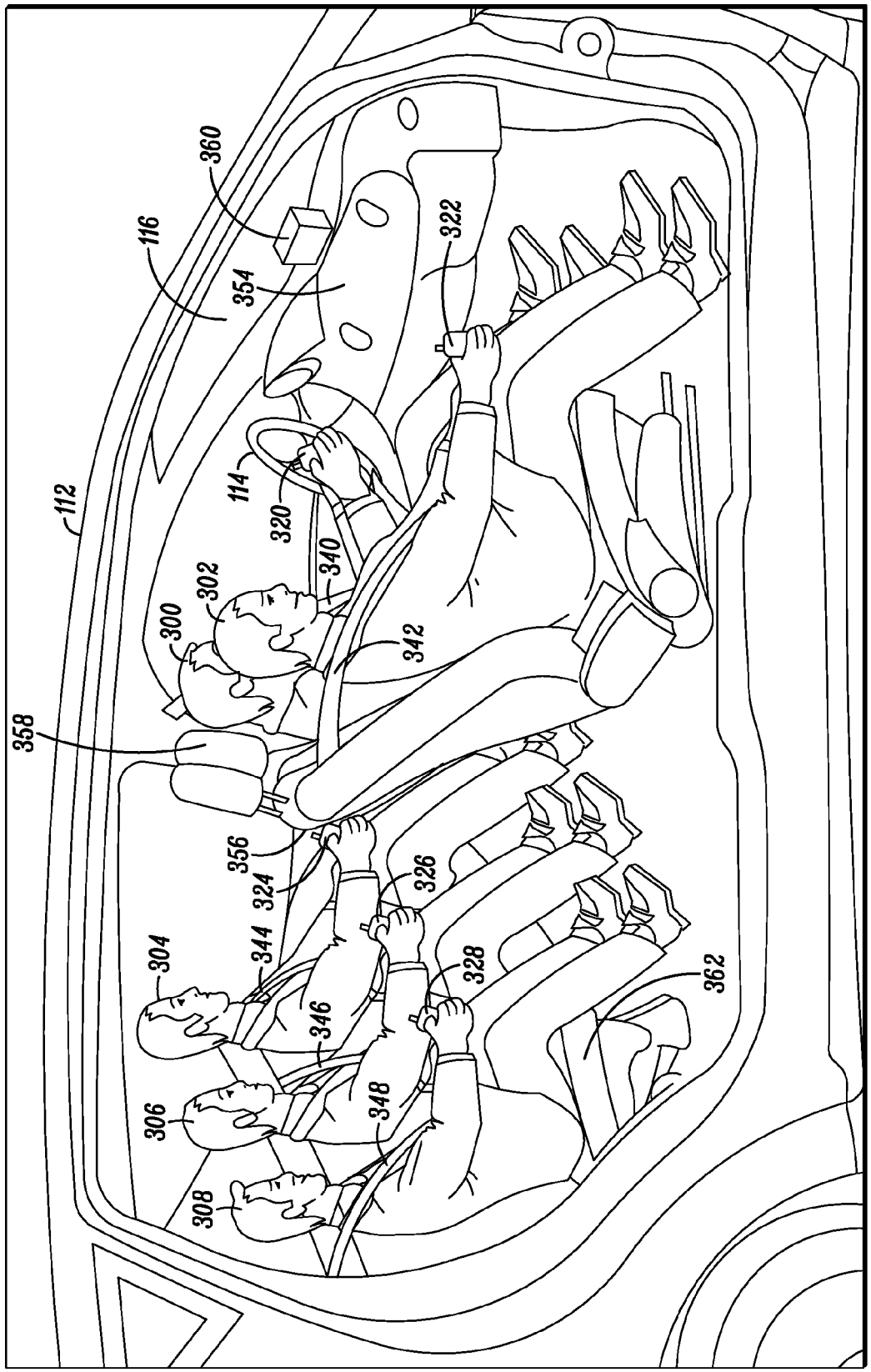
FIG. 3 is a diagram showing a plurality of people operating electronic devices while sitting within restraining devices of a vehicle.

Referring now to FIG. 3, which shows a cutaway view of the vehicle 112 having five occupants. As described herein a person sitting in a driver's seat 358 of the vehicle will be referred to as a driver. A person sitting in a seat other than the driver's seat 358 will be referred to as a passenger. As shown, a driver 300 and four passengers 302, 304, 306, and 308 occupy the vehicle 112. In the illustration of FIG. 3, each of the people 300, 302, 304, 306, 308 is, respectively, holding an electronic device 320, 322, 324, 326, 328, similar to the electronic device 104 shown in FIG. 1, and having similar internal components 200 described in relation to FIG. 2.

Each person 300, 302, 304, 306, 308 is, respectively, sitting within a restraining device 340, 342, 344, 346, 348 also commonly referred to as a seatbelt. Further, each person 300, 302, 304, 306, 308 is sitting in a different location within the vehicle 112; accordingly, each person's view of the interior of the vehicle 112 differs. For example, the steering wheel 114, a dashboard 354, and a front windshield 116 are in front of the driver 300. The front passenger's 302 view, however, differs at least in one respect because the steering wheel 114 is not in front of the passenger 302. Further, backseat 362 passengers 304, 306, 308 see the back of front seats 356 and 358, but the front seat passengers 300, 302 do not. Similarly, each communication device 320, 322, 324, 326, 328 can capture different views of the vehicle 112 interior using the respective one or more cameras on the device.

The front facing cameras' 228 and rear facing cameras' 238 views differ depending on how each electronic device 320, 322, 324, 326, 328 is held. If, for example, the electronic device 320 of the driver 300 is held at head level, the front facing camera 228 view likely includes the driver's 300 face and restraining device 340, but probably not the driver's 300 lap. The rear facing camera's 338 view correspondingly likely includes the windshield 116 and the top of the steering wheel 114, but probably not a full view of the steering wheel 114 or the floor of the vehicle. Moreover, the view of each electronic device 320, 322, 324, 326, 328 can include certain items within the vehicle 112. For example, the view of the front facing camera 228 of each of the person's 300, 302, 304, 306, 308 respective electronic device 320, 322, 324, 326, 328 might include the person's respective restraining device 340, 342, 344, 346, 348 and the person's body and face. Whereas, a view of the rear facing camera 238 of front seat 356 passenger 302 might include the dashboard 354 and the front windshield 116. A view of the rear facing cameras 238 of the backseat passengers 304, 306, 308 likely includes the back of the front seat 356 and/or 358 depending on the passenger.

As, will be described more fully below, the front facing camera 228 of each electronic device 320, 322, 324, 326, 328 might detect a respective restraining device 340, 342, 344, 346, 348 within which each respective person 300, 302, 304, 306, 308 sits. The orientation of each restraining device 340, 342, 344, 346, 348, however, is not necessarily the same. The orientation of the restraining device 340, 342, 344, 346, 348 is based, for instance, on where the person 300, 302, 304, 306, 308 sits in the vehicle 112 and a geographic location in which the vehicle 112 is intended to be driven. For example, for a vehicle 112 manufactured for driving in the United States, the orientation of the driver's 300 restraining device 340 slants from the upper right to the lower left side of the front facing camera 228 view of electronic device 320. On the other hand, the orientation of the front passenger's 302 restraining device 342 slants from an upper left to a lower right corner of the front facing camera 228 view of electronic device 322. Similarly, the respective restraining devices 344, 346, 348 of the passengers 304, 306, 308 in the back seat 362 are oriented based on where the passenger 304, 306, 308 is sitting in the back seat 362.

If, however, the vehicle 112 is manufactured for driving in Great Britain, the driver 300 sits on the right side of the vehicle and the front seat 356 passenger 302 sits on the left side. Accordingly, the driver's 300 restraining device slants from the upper left to a lower right corner of the front facing camera 228, and the front seat 356 passenger's 302 restraining device slants from the upper right to a lower left corner of the front facing camera 228.

The orientation of the restraining device of some of the occupants 300, 302, 304, 306, 308 of the vehicle 112, however, may be similar. For example, the restraining device 344 of the passenger 304 sitting behind the driver 300 is typically oriented in a similar manner as the driver's 300 restraining device 340. The seating position within the vehicle of each passenger 300, 302, 304, 306, 308, however, is discernible based on objects, including the restraining device 340, 342, 344, 346, 348, that appears in the view of the front 228 and rear 238 facing cameras.

Figure 4:
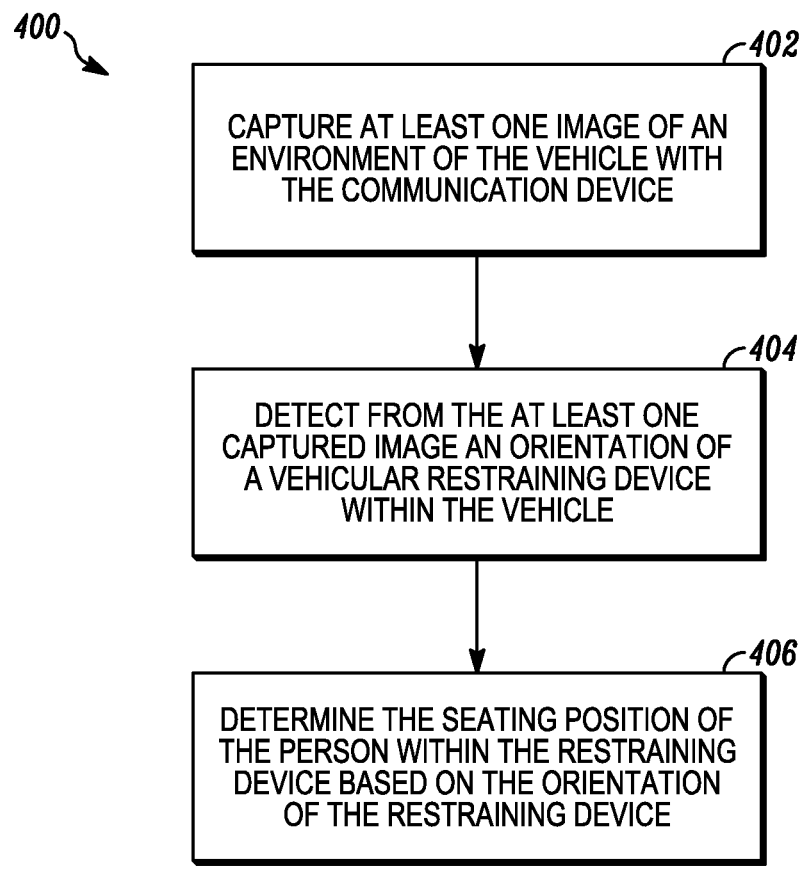
FIG. 4 is a flow diagram illustrating an embodiment of a general method for determining the seating position of a person within a vehicle based on an orientation of a restraining device.

We turn now to a detailed description of the functionality of a device such as the devices shown in FIGS. 1, 2 and 3, in accordance with the teachings herein and by reference to the remaining figures. FIG. 4 is a logical flow diagram illustrating one method 400 performed by an electronic device, such as the electronic device 104, 320, 322, 324, 326, or 328, for determining a seating position of a driver or passenger within a restraining device of the vehicle 112 and holding the device 104, 320, 322, 324, 326, or 328. As explained more fully below, the device 104, 320, 322, 324, 326, or 328 determines the seating position at least in part based on the orientation of the restraining device holding the person.

Turning now to details of a method 400 of FIG. 4, an electronic device, e.g., 104, captures 402 at least one image of an environment of the vehicle 112. In one example scenario, the front facing camera 228 captures or takes the at least one image. However, where the electronic device 104 also includes a rear facing camera 238, the rear facing camera 238 can also capture one or more images of the vehicle's environment. The at least one image can include one or more still pictures and/or a video that includes a sequence of still images.

The electronic device 104 is configured to detect 404 whether the at least one captured image contains a restraining device and, if so, determine 404 an orientation of the restraining device. The electronic device 104 is further configured to determine 406 the seating position of the person within the restraining device based on the orientation of the restraining device. For example, a processor within the electronic device 104, such as the main processor 210 or the secondary processor 240 processes the one or more captured images to detect the restraining device and its orientation. In one implementation scenario, the memory 224 contains information to which an image, image fragments, or information computed from an image or image fragment are compared to determine whether an image contains a restraining device or portions thereof.

For example, the memory 224 can have stored therein features such as width and color of a seatbelt for a particular vehicle 112 or a range of features such as a range of widths and colors that characterize a number of makes and models of vehicles. Where features detected from one or more captured images match stored features of a given restraining device, the processor is considered to have detected the restraining device. Once a restraining device is detected in an image, the processor performs further image processing to determine, for example, one or more angles relative to the detected restraining device and/or parts of the face or body of a person detected within the restraining device to determine an orientation of the restraining device.

In one particular embodiment, the electronic device 104 is configured to perform some operations such as detecting and processing voice commands, displaying icons that indicate receipt of emails or other messages, etc., in a low power mode using the secondary processor 240. This processor 240 could also be used to process the at least one captured image without awakening the primary processor 210, thereby preserving battery life.

In another embodiment, the electronic device 104 uses the wireless interface 202, which is coupled to the processor 210 and/or 240 and to the imaging apparatus 228, 238, to communicate the at least one captured image to an external processor. The wireless interface 202 is further configured to receive from the external processor a response indicating a seating position of the person within the restraining device and to provide the response to the processor 210 or 240 for use in determining the seating position of the person within the restraining device based on the response from the external processor.

For example, the electronic device 104 sends the at least one image to a processor external to the vehicle 112, such as a processor within the server 128, to perform at least a portion of the image processing including comparing the at least one captured image with particular designs, makes and models of vehicle interiors as part of determining the seating position of a person within a restraining device. In another embodiment, the electronic device 104 sends the at least one image to a processor that is internal to the vehicle 112 but is external to the electronic device 104, such as a processor 360 within the vehicle 112, which in one embodiment is included within the docking station 106, to perform at least a portion of the image processing.

In this embodiment, the external processor processes the at least one captured image and sends back to the electronic device 104 a response indicating the seating position of the person in the restraining device. This indication includes any information, such as the seatbelt orientation, that would allow the electronic device 104 to perform additional processing to determine the seating position. Alternatively, the response includes a determination of the seating position. In such a case, the electronic device 104 "determines" the seating position as a consequence of receiving the seating position determination from the external device.

At 406, the processor uses an orientation of the restraining device to determine the seating position of the person within the restraining device. Methods and examples of detecting a restraining device within one or more captured images and determining the seating position of the person within the restraining device are described more fully in conjunction with the remaining FIGS. 5-9.

Figure 5:
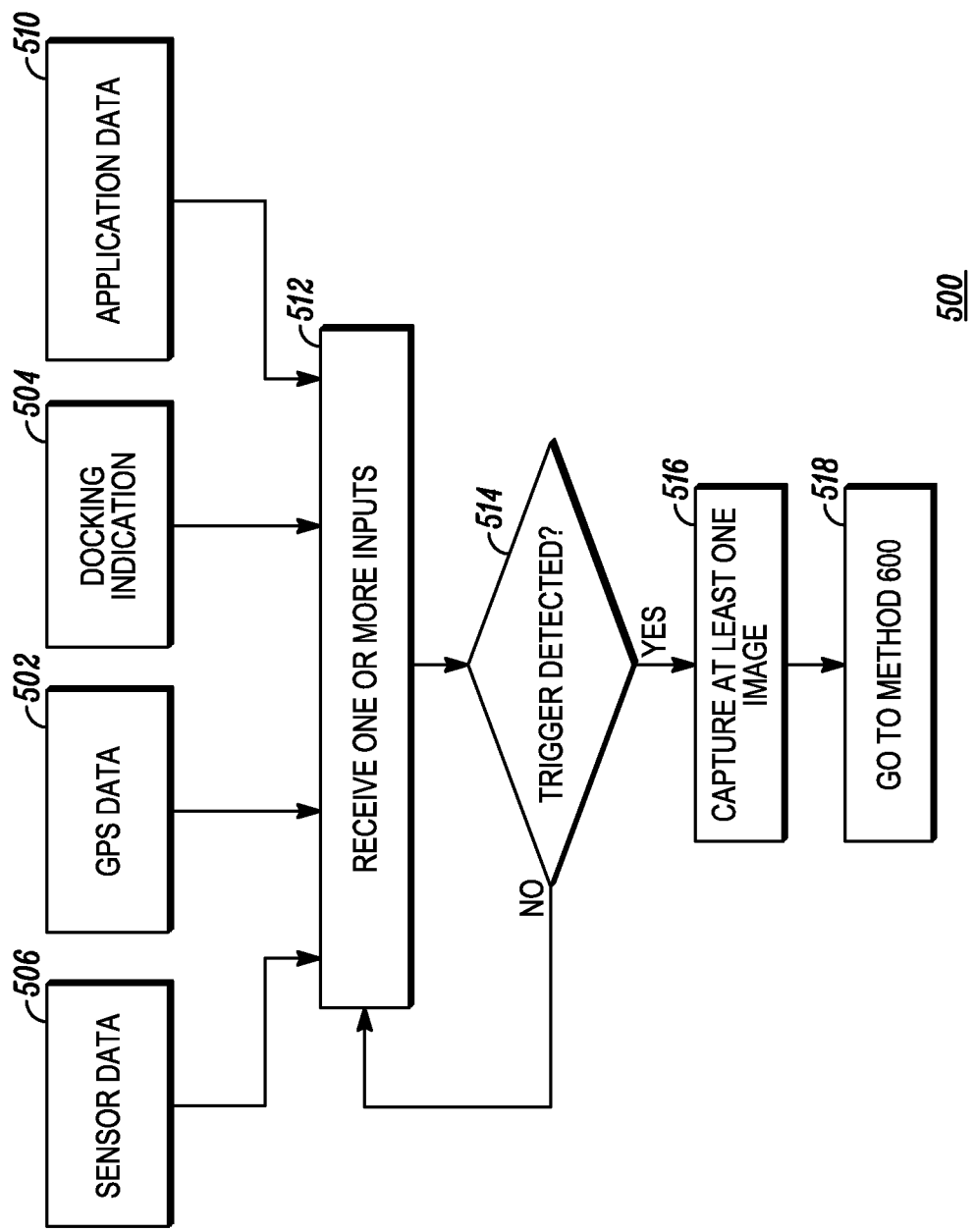
FIG. 5 is a flow diagram illustrating an embodiment of a method for detecting a trigger associated with the use of an electronic device in accordance with the present teachings.

We now turn to FIG. 5, which illustrates a flow diagram 500 showing examples of receiving 512 various data 502, 504, 506, 510 and determining 514 whether any of the received data triggers the electronic device 104 to capture 516 at least one image and start 518 a method, e.g., 600, for determining a seating position of a person in a vehicle based on seatbelt orientation, in accordance with the present teachings. More particularly, in response to detecting 514 the trigger, one or both of the front 228 and rear 238 facing cameras captures 516 the at least one image. In one example scenario, the data 502, 504, 506, 510 is sent to the application processor 210 and/or the secondary processor 240, which determines 514 if a trigger is detected. Thus, the device 104 includes one or more of the gyroscope 244, the magnetic compass 242, the GPS 206, the pressure sensor 252, or the accelerometer 248 coupled to at least one processor 210, 240 and configured to provide an input to the at least one processor 210, 240 to use in determining the seating position of a person within the restraining device.

With further regard to the inputs 502, 504, 506, 510, the GPS transceiver 206 receives GPS data 502 which includes, in one example, information about a geographic location, such as a country or region of the electronic device's 104 current location. To generate the data 504, the component interface 220, for instance, detects that the electronic device 104 is within the vicinity of the car docking station 106, but not docked within the car docking station 106, which results in triggering 514 the capturing 516 of at least one image based on detecting the electronic device 104 within the vicinity of the car docking station 106. The device 104, through low power radio frequency technologies, such as Bluetooth or radio frequency identification, can detect that the device 104 is within the vicinity of the car docking station 106, but the electronic device 104 is not docked in the car docking station 106. In one embodiment, if the electronic device 104 is docked in the docking station 106, the component interface 220 detects that the electronic device is docked, which fails to trigger the capturing of images. Accordingly, the capturing 516 of at least one image is triggered 514 when the device 104 is near, but not in the docking station 106.

One or more of the magnetic compass 242, gyroscope 244 and/or the accelerometer 248 can generate sensor data 506. A processor, such as the secondary processor 240, in some examples, is configured to indicate whether the electronic device 104 is in the vehicle 112, based on sensor data 506 including pressure sensor 252 data, and/or other information such as an indication 504 that the device 104 is near the car docking station 106.

Further, application data 510 generated based on the execution of an application, such as texting, web browsing, a voice data call, and/or an application that requires user interaction with the electronic device touchscreen 232 can result in a trigger. Twitter, Instagram, Facebook, and Snapchat are examples of applications that require user interaction with the touch screen 232. Thus, one embodiment includes detecting 512 application data 510 that indicates the start of the execution of an application executing on the electronic device 104, and triggering 514 the capturing 516 of the at least one image based on the execution of the application. Further, detecting 512 application data 510 indicating the execution of the application includes detecting the execution of at least one of a texting session, a browsing session, a voice call, or an application that requires user interaction with the electronic device touchscreen 232.

In yet another embodiment, the at least one image is captured in a background mode but is not displayed on the visual output 214. Instead, the captured image and/or data corresponding to or representing the captured image is communicated to at least one processor 210, 240 and/or stored in memory 224 of the electronic device 104 or in the external storage device 126.

In a further embodiment, the electronic device 104 only expends processing power to perform the method 500 when the device 104 detects that it is moving. For example, if one or more of the sensor data 506 and/or the GPS data 502 indicates motion, a trigger is detected 514, one or more images are captured 516, and method 600 is executed 518 while the motion continues. When, however, the one or more inputs 512 indicate that motion has stopped, a trigger is not detected 514, and thus images are not captured 516. If the motion resumes, a trigger is detected 514 and images are again captured 516 and the method 600 is executed 518. Moreover, the device 104 can receive 512 sensor data 506 and/or a docking indication 504 to determine whether the device 104 is moving as a consequence of being within a moving vehicle before triggering 514 the capture 516 of the one or more images and proceeding 518 to execute the method 600.

Figure 6:
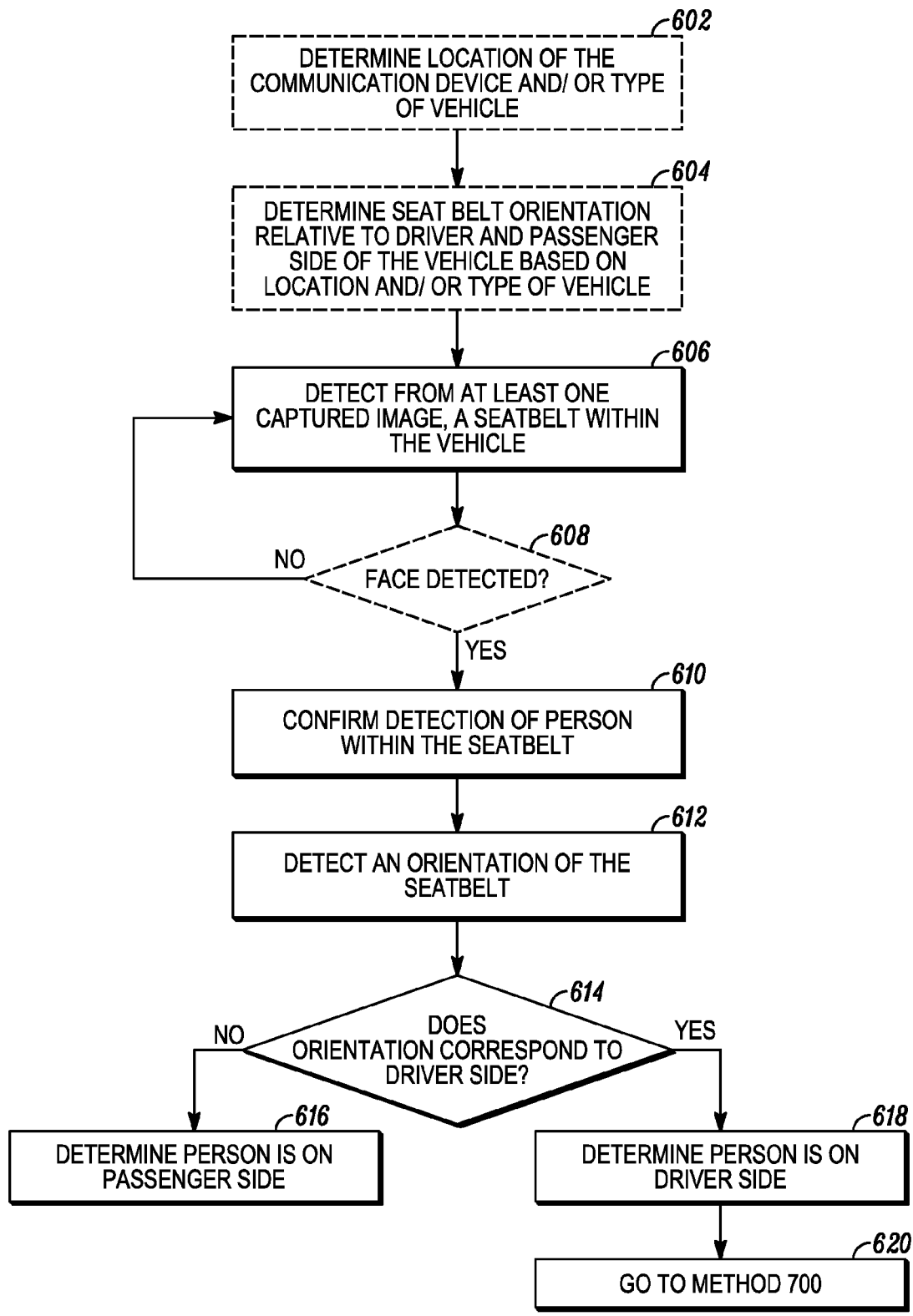
FIG. 6 is a flow diagram illustrating an embodiment of a method for detecting whether a person using an electronic device is sitting on a driver's or passenger's side of a vehicle based on an orientation of a restraining device in accordance with the present teachings.

Turning now to FIG. 6, which shows one example of a method 600 for determining whether the person operating the electronic device 104 is sitting in a location within the vehicle that corresponds to the passenger's side or driver's side of the vehicle 112. In one embodiment, the electronic device 104 first determines 602, 604 a seatbelt orientation relative to the driver and passenger sides of the vehicle to use in comparing to a seatbelt orientation detected from one or more images captured by the device 104. For example, the device 104 is programmed to perform functions 602 and 604 for a user who frequently travels or where the device 104 detects, e.g, via receiving an indication of being near an unrecognized docking station within a vehicle, that the user is not in a recognized vehicle.

In one aspect of this embodiment, a geographic location of the electronic device 104 is determined 602, and a seatbelt orientation relative to the driver and passenger sides of the vehicle is determined 604 based on the geographic location of the electronic device 104. One or more techniques including, but not limited to, GPS location techniques, multi-angulation (e.g., triangulation) techniques, and/or receiving location information such as a GSM country code or some type of cellular identification code correlated to location information, by way of example, from the base station 118, may be used to determine a geographic location of the electronic device 104.

In one example, the electronic device 104 uses data stored on the electronic device 104 and/or data retrieved from storage device 126 or server 128 to determine in which country the electronic device 104 is currently located based on the location data for the electronic device 104. The country is then identified as a right-hand traffic country, which correlates 604 to a left-hand drive vehicle configuration, or a left-hand traffic country, which correlates 604 to a right-hand drive vehicle configuration. The restraining device orientations for the driver side and the passenger side can then be determined depending on whether the vehicle 112 has a left-hand or right-hand drive configuration.

In some embodiments, the seatbelt orientation depends on the vehicle type. Therefore, the type of vehicle can also be determined at 602 to further pinpoint 604 the seatbelt orientations for the driver side and passenger side of a vehicle in the particular country in which the electronic device 104 is currently located. For example, vehicles used to deliver mail can have the steering wheel 114 on the right side of vehicle, as opposed to the left side of the vehicle for an automobile, in some right-hand traffic countries. In such a case, the seatbelt orientation for the driver side and the passenger side for the mail delivery vehicle would be opposite that of an automobile. This would certainly impact the accurate determination 614 of whether a seatbelt orientation detected from an image was for a driver side occupant or a passenger side occupant.

Moreover, the passenger and driver side seatbelt orientations for various vehicle types, in some embodiments, are configured in the memory 224 of the electronic device 104. In other embodiments, the electronic device 104 is configured to query the storage device 126 or server 128 to retrieve passenger and driver side seatbelt orientations for the vehicle type. In another example, the electronic device 104 uses a web mapping application to determine the type of vehicle. For instance, if a web mapping application indicates that the vehicle is currently operating on train tracks, the electronic device 104 might determine 602 that the vehicle is a train, which may have particular seatbelt types and orientations for the driver's side, which is associated with an engineer's seating position in a train.

When the device 104 knows the correct seatbelt orientation for the passenger side and the driver side of the vehicle (e.g., for making later determinations in accordance with the present teachings), an image processing function executed by a processor of the electronic device 104 can detect 606 a seatbelt from one or more captured images. However, in some instances, the image processing function may falsely detect a restraining device. In order to reduce the number of false detections, the image processing functionality, in one example, makes further determinations to decide whether a restraining device is in a captured image.

In one such further determination, the image processing functionality detects 608, from the at least one captured image, a face or part of a face of a person within the restraining device, and confirms 610 detection of a restraining device based on whether the detected face appears above what is believed to be the restraining device. If the face appears below the restraining device, a false detection of the restraining device has occurred. If the image processing functionality does not detect a face in the at least one image, the image processing functionality continues to attempt to detect 606, from the at least one captured image, a seatbelt within the vehicle.

After confirming 610 detection of the seatbelt, an orientation of the seatbelt is detected 612. If the orientation does not correspond 614 with an orientation of the seatbelt on the driver's side 110 the vehicle 112, the person is determined 616 to be on the passenger's side 108 of the vehicle 112. If the person is seated on the passenger's side 108 of the vehicle 112, no further action is necessary. If the orientation corresponds 614 with an orientation of the seatbelt on the driver's side 110 of the vehicle 112, the image processing functionality determines 618 that the person is on the driver's side 110 of the vehicle 112, and method 700 is performed 620.

At this point, based on the orientation of the restraining device detected in the at least one captured image, the person operating the electronic device 104 is believed to be sitting on the driver's side of the vehicle. The person operating the electronic device 104, however, is not necessarily sitting in the driver's seat 358 of the vehicle 112. For example, the person operating the electronic device 104 might be sitting in the backseat 362 behind the driver 300. The restraining device 344 of the person 304 sitting in the seat behind the driver 300 likely has a seatbelt orientation similar to the orientation of the driver's 300 seatbelt 340. Similarly, in some vehicles, the orientation of the seatbelt of the person 306 sitting in the rear middle seat is similar to the orientation of the driver's 300 seatbelt 340. In some embodiments, in order to further determine if the seatbelt detected in the captured image is actually the driver's seatbelt 340, the image processing functionality performs further checks such as described by reference to FIG. 7.

Figure 7:
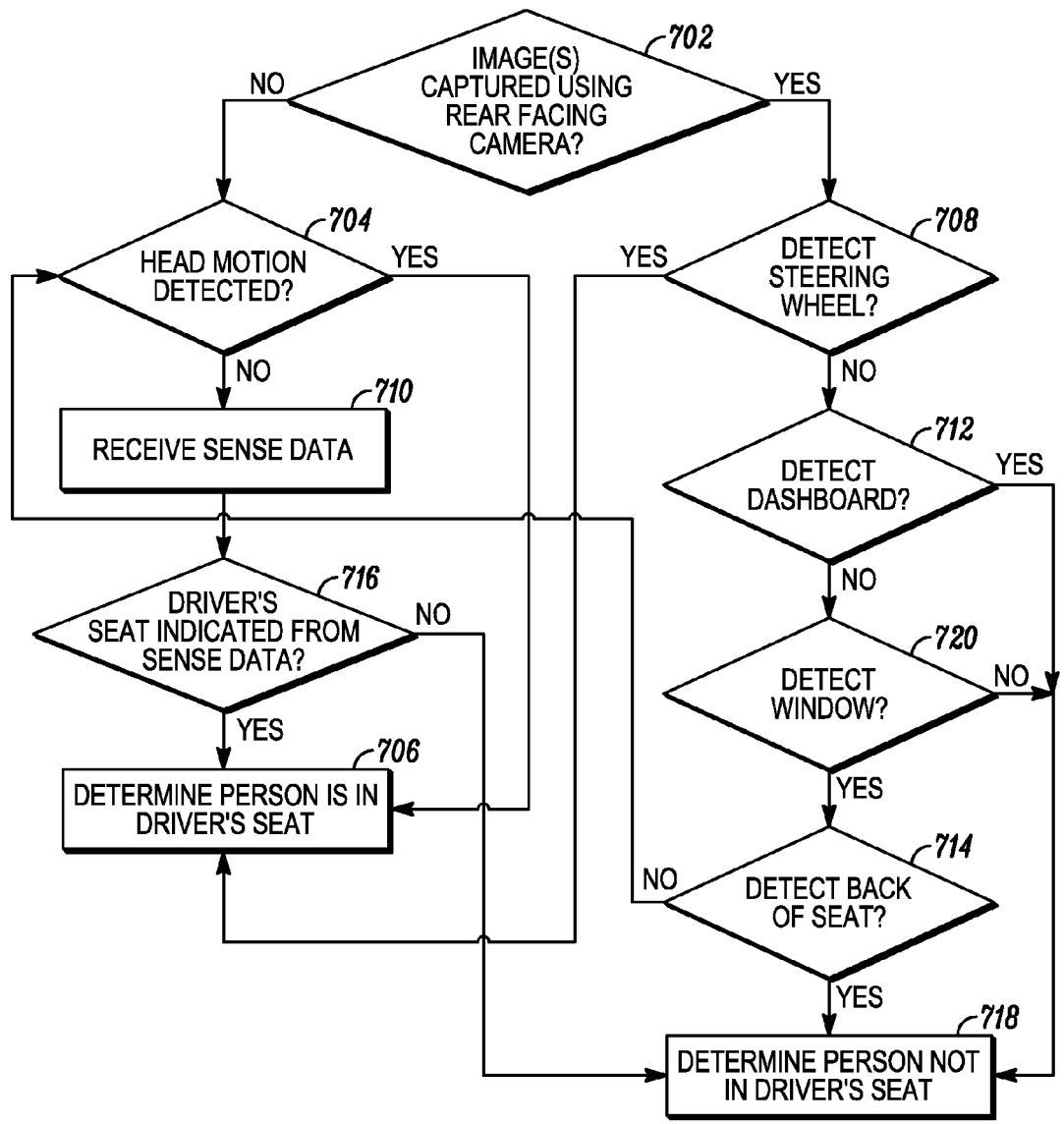
FIG. 7 is a flow diagram illustrating an embodiment of a method for detecting whether the user of an electronic device is sitting in the driver's seat of a vehicle based on an orientation of a restraining device in accordance with the present teachings.

Turning now to FIG. 7, which depicts a flow diagram 700 for further determining if a restraining device detected in the at least one captured image is the driver's seatbelt 340. In one example scenario, the flow diagram 700 includes detecting, from the at least one captured image, at least one of the steering wheel 114, the dashboard 354, a window (such as the windshield 116 or a side or rear window of the car), or the back of the seat 356 or 358, and determining the seating position of a person within a restraining device based on at least one of the detected steering wheel, dashboard, window, or back of the seat.

For one embodiment, the electronic device 104 determines 702 whether the at least one image was captured using the front facing 228 or rear facing 238 camera. If, at 702, the front facing camera 228 has captured the one or more images, for instance in captured video, the image processing functionality determines 704 whether head motion of the person within a restraining device was detected. Based on whether head motion was detected, the image processing functionality can determine the seating position of the person within the restraining device. For example, when interacting with his electronic device 320, the driver 300 of the vehicle 112 typically moves his head more frequently than a passenger of the vehicle. This is because the vehicle driver 300 has to check for traffic through the windshield 116, rear view mirror, side view mirror, out a side window, and/or out a back window to avoid an accident. If the image processing functionality detects 704 head motion, for instance above some set threshold, the image processing functionality determines 706 that the person is sitting in the driver's seat 358.

If, at 704, the image processing functionality does not detect the requisite head motion, sense data is received 710 from at least one sense device, and the seating position of a person within the restraining device is determined based on the sense data. In one embodiment, one or both of the processors 210, 240 receive the sense data, which may include data from the magnetic compass 242, the gyroscope 244, the accelerometer 248, and the pressure sensor 252. In one example, one or more of the sense data is used to help determine 716 the seating position of the person holding the electronic device 104. For instance, GPS data is used to determine whether a person is sitting on a left side or right side of the vehicle 112. Assuming the vehicle 112 is travelling near the center of a driving lane, GPS data is accurate enough to ascertain whether the device 104 is located to the left or right of the center of the driving lane. This information is then used to determine if the person holding the device 104 is sitting on the left or right side of the vehicle.

In a further embodiment, the sense data is used to determine 716 if a person is sitting in the left, right or middle of a vehicle based on forces exerted while the vehicle 112 is turning. In still another example, the image processing functionality detects from the at least one captured image at least one of head motion or arm motion of the person within the restraining device or movement of a steering wheel. The seating position of the person within the restraining device is determined based on at least one of the detected head motion, the detected arm motion, the detected movement of the steering wheel, sense data, or Global Positioning System data.

Illustratively, a user holds the electronic device 104 or the electronic device 104 is positioned in the docking station 106 such that the image processing functionality detects one or more of arm movement of the user or movement of the steering wheel 114. For example, the user holds the electronic device 104 such that a view of the device 104 includes the arm of the user that is turning the steering wheel. The arm motion from turning the steering wheel illustratively includes a distinctive motion that the image processing software identifies as arm motion associated with turning the steering wheel. Accordingly, when the GPS data and/or the sensor data indicates that the vehicle is engaged in a turn, the image processing functionality determines that the movement of the arms and/or movement of the steering wheel 114 is consistent with movement associated with a turn, which indicates that the user is sitting in the driver's seat.

Figure 9:
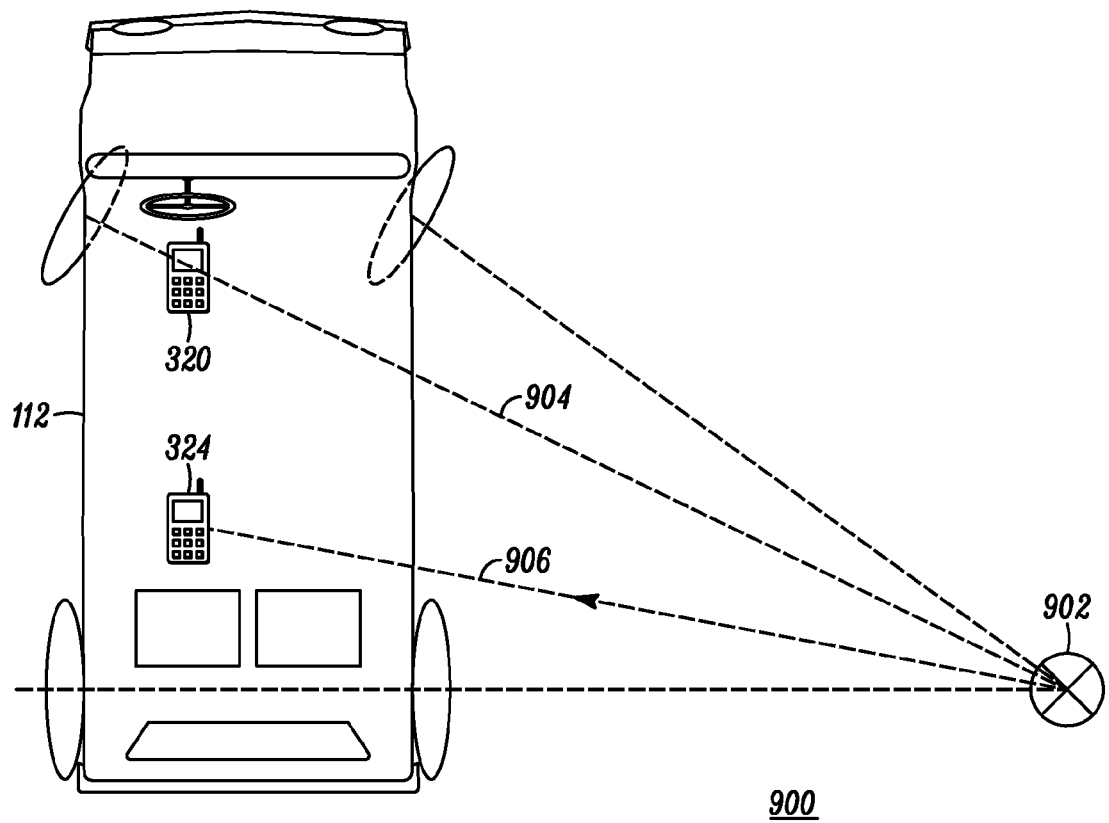
FIG. 9 illustrates one example of forces experienced by one or more passengers and their one or more electronic devices when a vehicle is turning.

Turning briefly now to FIG. 9 which illustrates, at 900, forces experienced by the driver 300 and the passenger 304 and their respective electronic devices 320, 324 when the vehicle 112 is engaged in a right turn. The radial center of the turn is shown at 902. As further illustrated, the driver 300 and his device 320 experiences an angle of force 904, and the passenger 304 and his device 324 experiences a different angle of force 906. Similarly, the other passengers 302, 306, 308 in the vehicle 112 and their respective devices 322, 326, 328 experience different angles of force, although not shown. The various sensors, such as the gyroscope 244, the accelerometer 248 and the magnetic compass 242, measure centripetal and centrifugal forces exerted on the electronic devices 320, 324. Based on the angle of force, the electronic device, in one example, is configured to estimate whether it is located in the front, back, left side, right side, or middle of the vehicle 112.

The vehicle 112 occupants also experience a directional velocity. Before the turn was made, the directional velocity is forward, but during the turn, the directional velocity tends toward the direction of the turn. Input from one or more of the sensors 222 or the GPS transceiver 206 is used to determine the directional velocity. In one embodiment, a history of the various directional velocities and the input from the GPS transceiver 206 is used to determine the left and right turns of the vehicle 112. The respective angles of force, e.g., 904, 906, which the devices 320, 324 experience along with the directional velocities, in one example, are used to determine a seating location of the persons holding the devices 320, 324.

Returning now to FIG. 7, if it is instead determined at 702 that the electronic device 104 captured images using the rear facing camera 238, the image processing functionality looks for other items within the captured images, such as the steering wheel 114 at 708, the dashboard 354 at 712, a window at 720, or the back of the seat 356 and/or 358 at 714 to determine at 706, 718, respectively, whether or not the person holding the electronic device 104 is in the driver's seat 358. For example, where at 708 the steering wheel 114 is detected in a captured image, the image processing functionality determines 706 that the person holding the electronic device 104 is seated in the driver's seat 358.

However, where the image processing functionality does not detect the steering wheel 114 in the captured image, it further analyzes the captured image to determine 712 whether the image includes the dashboard 354. Where the image processing functionality detects the dashboard 354, it determines 718 that the person holding the electronic device 104 is not in the driver's seat 358 but is instead sitting in the front seat 356 on the passenger's side 108 of the vehicle 112. Where at 712 the image processing functionality does not detect the dashboard 354, it searches the captured image to detect 720 a window, for example the windshield 116. In one embodiment, where no window is detected in the captured image, the image processing functionality determines 718 that the person holding the electronic device 104 is not in the driver's seat 358. However, where at 720 a window is detected in the captured image, the image processing functionality further analyzes the captured image at 714 to determine whether or not the person holding the device 104 is in the driver's seat 358.

In one example, the device 104 is configured to search the captured image for a point of reference, such as a face. Based on a distance between the point of reference and the detected window, the device 104 can estimate where it is located. For example, if the distance between the detected face and the windshield 116 is large, the image processing functionality determines that the user of the device 104 is most likely sitting in the backseat 362 of the vehicle 112 and proceeds to perform function 714 to confirm that the person holding the device 104 is sitting in a passenger seat and not the driver's seat 358. Particularly, at 714, the image processing functionality determines whether the back of the front seat 356 or 358 is detected in the captured image. Where the image processing functionality detects 714 the back of the front seat 356 or 358, it further determines 718 that the person holding the electronic device is sitting in the backseat of the vehicle 112 and not in the driver's seat 358. Otherwise, the method 600 returns to 704 for further image processing to determine whether or not the person holding the device 104 is in the driver's seat 358.

Figure 8:
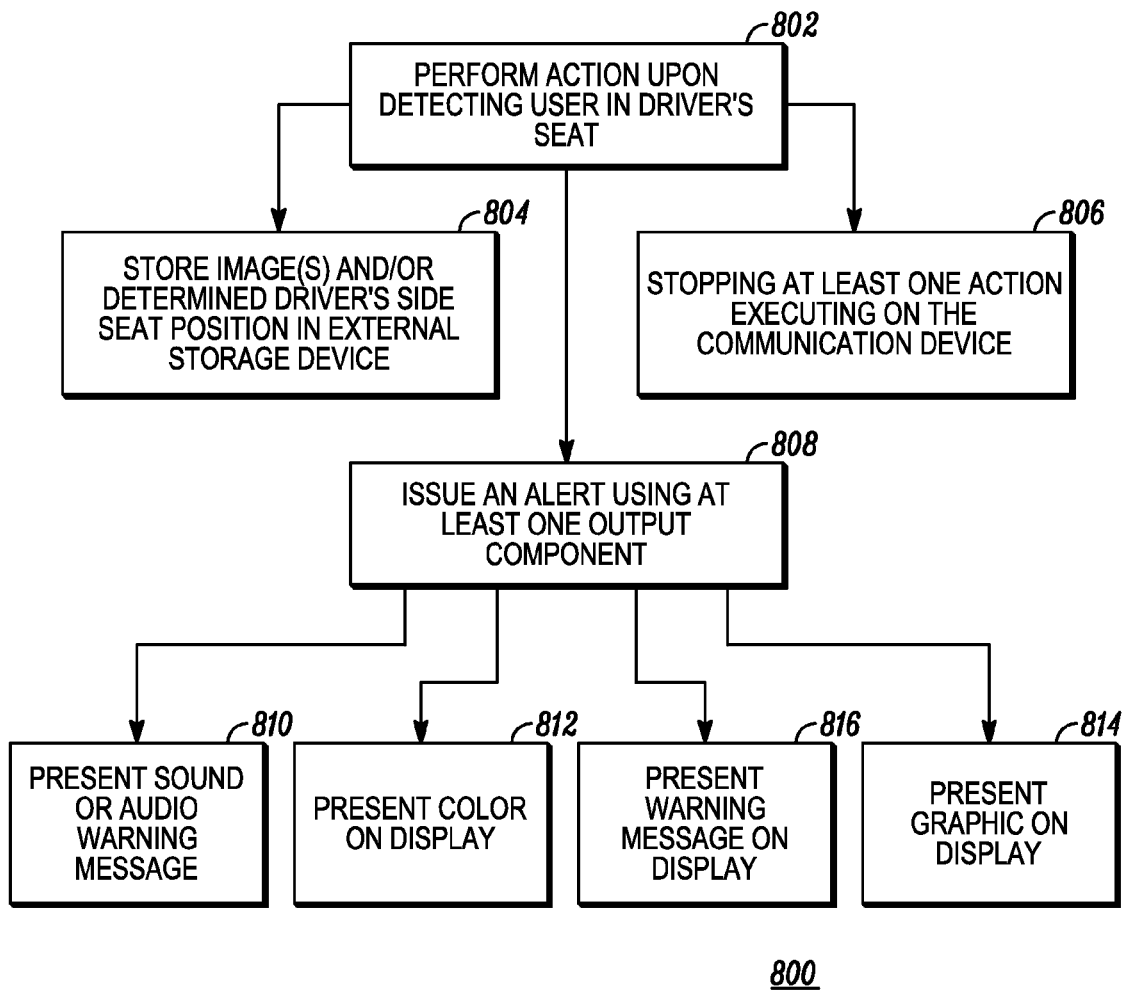
FIG. 8 is a flow diagram illustrating an embodiment of a method for performing an action when a person is using an electronic device while seated in the driver's seat of a vehicle in accordance with the present teachings.

Turning now to FIG. 8, which illustrates a flow diagram 800 showing various actions that can be performed at 802, alone or in combination, if the image processing functionality determines 706 that the person holding the electronic device 104 is sitting in the driver's seat 358. In one example scenario, the action includes storing 804 data corresponding to at least one of the determined seating position of the person using the electronic device 104 or the at least one captured image. In an embodiment, the data is stored in memory 224. In other examples, the data is stored in a storage device external to the electronic device 104, such as the storage device 126. In some embodiments, if the person using the electronic device 104 is sitting in the driver's seat 368, the stored data includes storing captured images, the time the electronic device 104 captured the images, the driving speed of the vehicle at the time the images were captured, the geographic location of the electronic device 104 when the images were captured, etc., for use by insurance companies or law enforcement authorities, for instance.

In a further embodiment, where it is determined 706 that the user of the electronic device 104 is sitting in the driver's seat 358, the action 802 can include stopping 806 at least one application executing on the electronic device 104. For example, if the driver 300 is texting, the action 802 includes stopping 806 the texting application executing on the electronic device 104.

In yet another embodiment, the device 320 includes an output component 212, coupled to the processors 210, 240, which is configured to provide 808 an alert indication in response to the processor 210 and/or 240 determining 706 that the seating position is the driver's seat 358. Accordingly, the action 802 performed includes issuing or presenting 808 the alert using at least one output component 212. The alert includes, in one example, presenting 810 a sound or audio warning message using the speaker 216 to inform the user that he is using the electronic device 320 while sitting in the driver's seat 358. In another embodiment, the alert includes presenting 812 a bright color on the display 214 of the electronic device 320. The bright color can call attention to the driver 300 that he is using the electronic device 320 while in the driver's seat 358. In other examples, the alert includes presenting 814 a graphic on the display 214 of the electronic device 320 or presenting 816 a warning message on the display 214.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., including a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method comprising:
  receiving, by an electronic device and using low power radio frequency technology, an indication that the electronic device is within a vicinity of a vehicle;
  detecting execution of an application by the electronic device while the electronic device is within the vicinity of the vehicle;
  responsive to detecting the execution of the application, capturing, by a camera of the electronic device, at least one image of an environment of the vehicle;

detecting, by the electronic device and based at least in part on the at least one image, an orientation of a restraining device within the vehicle;

determining, by the electronic device and based on the orientation of the restraining device, whether a user of the electronic device is sitting on a driver's side of the vehicle or a passenger side of the vehicle;

responsive to determining that the user is sitting on the driver's side of the vehicle, determining, based on the at least one image, whether the user is sitting in a driver's seat of the vehicle; and responsive to determining that the user is sitting in the driver's seat, performing, by the electronic device, an action including one or more of stopping the execution of the application or outputting an alert.

2. The method of claim 1, further comprising:

detecting, by the electronic device and based at least in part on the at least one image, one or more of a steering wheel, a dashboard, a window, or a back of a seat of the vehicle, wherein determining whether the user is sitting in the driver's seat is further based on the one or more of the steering wheel, the dashboard, the window, or the back of the seat of the vehicle.

3. The method of claim 1, further comprising:

detecting, by the electronic device and based at least in part on the at least one image, one or more of head motion of the user, arm motion of the user, or movement of a steering wheel of the vehicle, wherein determining whether the user is sitting in the driver's seat is further based on at least one of the head motion, the arm motion, or the movement of the steering wheel.

4. The method of claim 1, further comprising:

detecting, by the electronic device and based at least in part on the at least one image, a face of the user within the restraining device; and confirming, by the electronic device and based on the face, detection of the restraining device.

5. The method of claim 1, further comprising:

determining, by the electronic device, a geographic location of the electronic device, wherein determining whether the user is sitting on the driver's side of the vehicle or the passenger side of the vehicle is further based on the geographic location of the electronic device.

6. The method of claim 1, further comprising:

determining, by the electronic device, a type of the vehicle, wherein determining whether the user is sitting on the driver's side of the vehicle or the passenger side of the vehicle is further based on the type of the vehicle.

7. The method of claim 6, wherein the type of the vehicle is determined using a web mapping application executing on the electronic device.

8. The method of claim 1, wherein detecting the execution of the application comprises detecting the execution of at least one of a texting session, a browsing session, a voice call, or an application that requires user interaction with a touchscreen of the electronic device.

9. The method of claim 1, wherein the action further includes storing data corresponding to at least one of the determined seating position or the at least one captured image to a storage device external to the electronic device.

10. An electronic device comprising:

an interface configured to receive, using low power radio frequency technology, an indication that the electronic device is within a vicinity of a vehicle;

a processor configured to detect execution of an application by the electronic device while the electronic device is within the vicinity of the vehicle;

imaging apparatus configured to, responsive to the processor detecting the execution of the application, capture a set of images, which includes at least one image of a person within a restraining device of the vehicle, wherein the processor is further configured to:

determine, based at least in part on the at least one image, an orientation of a restraining device within the vehicle;

determine, based on the orientation of the restraining device, whether a user of the electronic device is sitting on a driver's side of the vehicle or a passenger side of the vehicle;

responsive to determining that the user is sitting on the driver's side of the vehicle, determine, based on the at least one image, whether the user is sitting in a driver's seat of the vehicle; and responsive to determining that the user is sitting in the driver's seat, perform an action including one or more of stopping the execution of the application or outputting an alert.

11. The electronic device of claim 10, wherein the processor is further configured to:

detect, based at least in part on the at least one image, one or more of a steering wheel, a dashboard, a window, or a back of a seat of the vehicle; and determine whether the user is sitting in the driver's seat based on the one or more of the steering wheel, the dashboard, the window, or the back of the seat of the vehicle.

12. The electronic device of claim 10, wherein the processor is further configured to:

detect, based at least in part on the at least one image, one or more of head motion of the user, arm motion of the user, or movement of a steering wheel of the vehicle, determine whether the user is sitting in the driver's seat based on at least one of the head motion, the arm motion, or the movement of the steering wheel.

13. The electronic device of claim 10, wherein the processor is further configured to:

detect, based at least in part on the at least one image, a face of the user within the restraining device; and confirm, based on the face, detection of the restraining device.

14. The electronic device of claim 10, further comprising:

a global positioning system transceiver configured to receiving global positioning system data, wherein the processor is further configured to:

determine, based on the global positioning system data, a geographic location of the electronic device; and determine whether the user is sitting on the driver's side of the vehicle or the passenger side of the vehicle based on the geographic location of the electronic device.

15. The electronic device of claim 10, wherein the processor is further configured to:

determine a type of the vehicle; and determine whether the user is sitting on the driver's side of the vehicle or the passenger side of the vehicle based on the type of the vehicle.

16. A non-transitory computer-readable storage medium encoded with instructions that, when executed, cause one or more processors of an electronic device to:

receive an indication that the electronic device is within a vicinity of a vehicle;

detect execution of an application by the electronic device while the electronic device is within the vicinity of the vehicle;

responsive to detecting the execution of the application, receive at least one image of an environment of the vehicle;

detect, based at least in part on the at least one image, an orientation of a restraining device within the vehicle;

determine, based on the orientation of the restraining device, whether a user of the electronic device is sitting on a driver's side of the vehicle or a passenger side of the vehicle;

responsive to determining that the user is sitting on the driver's side of the vehicle, determine, based on the at least one image, whether the user is sitting in a driver's seat of the vehicle; and responsive to determining that the user is sitting in the driver's seat, perform, by the electronic device, an action including one or more of stopping execution of the application or outputting an alert.

17. The non-transitory computer-readable storage medium of claim 16, wherein the instructions further cause the one or more processors to:

detect, based at least in part on the at least one image, one or more of a steering wheel, a dashboard, a window, or a back of a seat of the vehicle; and determine whether the user is sitting in the driver's seat based on the one or more of the steering wheel, the dashboard, the window, or the back of the seat of the vehicle.

18. The non-transitory computer-readable storage medium of claim 16, wherein the instructions further cause the one or more processors to:

detect, based at least in part on the at least one image, one or more of head motion of the user, arm motion of the user, or movement of a steering wheel of the vehicle, determine whether the user is sitting in the driver's seat based on at least one of the head motion, the arm motion, or the movement of the steering wheel.

19. The non-transitory computer-readable storage medium of claim 16, wherein the instructions further cause the one or more processors to:

detect, based at least in part on the at least one image, a face of the user within the restraining device; and confirm, based on the face, detection of the restraining device.

20. The non-transitory computer-readable storage medium of claim 16, wherein the instructions further cause the one or more processors to:

receive, from a global positioning system transceiver of the electronic device, global positioning system data;

determine, based on the global positioning system data, a geographic location of the electronic device; and determine whether the user is sitting on the driver's side of the vehicle or the passenger side of the vehicle based on the geographic location of the electronic device.

\* \* \* \* \*